United States Patent Office 3,652,707
Patented Mar. 28, 1972

3,652,707
PROCESS FOR THE POLYMERIZATION OF
OLEFIN HYDROCARBONS
George S. Saines, Fishkill, N.Y., assignor to
Texaco Inc., New York, N.Y.
No Drawing. Filed Sept. 16, 1969, Ser. No. 858,520
Int. Cl. C07c 3/18
U.S. Cl. 260—683.15 B          10 Claims

ABSTRACT OF THE DISCLOSURE

An olefin hydrocarbon polymerization process which produces a polymer having a molecular weight within the range of from about 700 to about 2500, by polymerizing such olefins in the presence of a Friedel Crafts metal halide catalyst in admixture with halogen containing hydrocarbon polymer cocatalyst, preferably in the presence of aluminum chloride in admixture with a poly-vinyl chloride polymer cocatalyst.

---

This invention relates to the catalytic polymerization of olefin hydrocarbons and more particularly to the polymerization of olefinic hydrocarbons utilizing a Friedel Crafts type metal halide and a halogen containing hydrocarbon polymer catalyst.

The conversion of olefin hydrocarbons into higher molecular weight polymers is well known. Polymerization may be accomplished by either catalytic or non-catalytic means but due to the relatively more severe operating conditions necessary for non-catayltic methods the majority of olefin polymerization is carried out by catalytic means. The catalysts which have been proposed for the catalytic polymerization of olefins range from absorbents such as activated clay through mineral acids such as phosphoric and sulphuric acids to Friedel Crafts type catalysts exemplified by the halides of aluminum, and boron. The Friedel Crafts type catalysts are more active and are more commonly used for polymerization of olefins to higher molecular weight products.

In addition it is well known that the use of various co-catalysts such as hydrogen chloride, methylchloride and ethylchloride as cocatalysts in combination with Friedel Crafts type catalysts for the polymerization of olefins produce viscous hydrocarbon polymers whereas the use of higher molecular weight alkyl halides provides little or no polymerization product particularly when alkyl halides having molecular weights above 150 are utilized as a co-catalyst.

It is an object of the present invention to provide a process for the polymerization of olefin hydrocarbons. It is still a further object of the present invention to provide a new and improved modified Friedel Crafts type catalyst system for the polymerization of olefin hydrocarbons to polymers having a molecular weight of from about 700 to about 2500. Additional objects will become apparent from the following description of the invention herein disclosed.

It has now been found that an olefin hydrocarbon can be polymerized to a polymer having a molecular weight within the range of from about 700 to about 2500 by a process which comprises contacting an olefin hydrocarbon and mixtures thereof under polymerization conditions of temperature and pressure with a catalytic amount of a Friedel Crafts metal halide and a chlorine containing hydrocarbon polymer, and recovering a polymer of said olefin hydrocarbon. More particularly it has been found that the use of a catalyst system comprising an aliphatic carbon bonded halogen containing high molecular weight hydrocarbon polymer and a Friedel Crafts metal halide, (hereinafter referred to as catalyst) particularly aluminum chloride, aluminum bromide, and boron trifluoride produces a polymer of said hydrocarbon olefin, hereinafter referred to as olefin polymer, which has a molecular weight within the range of from about 700 to about 2500, preferably from about 900 to about 1500, in significant yields. In addition the catalyst system has been found to be particularly effective during extended periods of use where the catalyst is used continuously for the polymerization of and olefin hydrocarbon.

In accordance with this method, the olefin feed, gaseous or liquid, contacts the catalyst comprising the Friedel Crafts metal halide and halogen containing hydrocarbon polymer in a conventional polymerization reactor under polymerization conditions of temperature, pressure, and catalyst and olefin concentration sufficient to produce a polymer product. The effluent is then recovered from the catalyst by conventional means such as by quenching the catalyst in a medium such as aqueous caustic or a water alcohol mixture, removing the halogen containing hydrocarbon polymer by filtration, followed by polymer recovery by dilution with hexane, washing with water and vacuum stripping. Alternatively, for example the catalyst and olefin can be continuously added to a conventional polymerization reactor or the catalyst can be added to an olefin feed under a liquefying pressure. It is contemplated within the scope of this invention that the polymerization of the olefin hydrocarbon can be carried out either by a batch, semi-continuous or a continuous method using conventional polymerization reactors heretofore utilized in the prior art.

The catalyst for the polymerization of the olefin hydrocarbon is a Friedel Crafts metal halide catalyst promoted with a halogen containing hydrocarbon polymer. The Friedel Crafts metal halide hereinafter referred to as metal halide and halogen containing hydrocarbon polymer hereinafter referred to as halogen polymer can be prepared for use as a catalyst system by blending the metal halide and halogen polymer, preferably in an inert atmosphere, with for example, a liquid medium substantially inert to the catalyst, reactants and polymerization products such as saturated aliphatic hydrocarbons having from 3 to 8 carbon atoms or saturated cycloaliphatic hydrocarbons having from 4 to 8 carbon atoms, examples of which are butane, propane, pentane, hexane, and cyclohexane. It is preferred to have the medium free of water, sulphur and unsaturated compounds. Of course it is contemplated within the scope of this invention that in carrying out the process of this invention, the catalyst including both metal halide and halogen polymer can be added separately with or without a liquid medium to the olefin hydrocarbon to be polymerized. It is preferred, however, in carrying out the process of this invention, especially where the olefin is gaseous at ambient temperature, to pass the olefin hydrocarbon through a catalyst solution comprising metal halide, halogen polymer and liquid medium. In general when a liquid medium is used, catalyst solutions comprise from about 0.5 to about 2.0 wt. percent of metal halide and from about 0.025 to about 1.0 halogen polymer in the liquid medium. The catalyst with or without a liquid medium can be prepared by mixing the metal halide and halogen polymer together at a temperature in general from about 0° C. to about 30° C. for a time generally from about 10 to about 60 minutes, although temperatures and times above and below those set forth above can in addition be utilized. In general the weight ratio of metal halide to halogen polymer can vary over a wide range and in general is from about 4:1 to about 0.5:1, more preferably from about 2:1 to about 1:1.

The time of contacting the catalyst and olefin hydrocarbon can vary over a wide range and in general times of from about 30 minutes to about 4 hours, preferably from about 2 hours to about 3 hours are utilized. The conditions of temperature, pressure and concentration of catalyst can vary over a wide range and in general a reaction temperature is utilized which is sufficient to effect polymerization, and in general is from about −10 to about 10° C., more preferably from about 0 to about 5° C. at pressures of from about 15 p.s.i.g. to about 1000 p.s.i.g., more preferably from about 200 p.s.i.g. to about 300 p.s.i.g. The amount of catalyst employed in general is from about 0.25 to about 25 wt. percent, more preferably from about 0.5 to about 15 wt. percent, based upon the olefins present in the reaction zone. By the use of the term concentration of catalyst present in the polymerization zone is meant the total catalyst including both metal halide and halogen polymer, but not including any liquid medium utilized in the polymerization zone. After completion of the polymerization the polymer can be isolated from the polymerization mixture by conventional methods such as filtration, solvent extraction, distillation absorption, crystallization, and the like.

The olefin hydrocarbons can be terminal, internal, branched or unbranched, and in general contain from 2 to about 20 carbon atoms, more preferably from 3 to about 6 aliphatic carbon atoms per molecule. In addition, mixtures of various olefins can be utilized. Typical examples of suitable olefins include ethylene, propylene, isobutylene, butene-1, pentene-1, pentene-2, 3-methylbutene-1, 4-methylpentene-2, octene-1, dodecene-1, tetradecene-1, styrene and a methylstyrene. The feed stock may be one containing relatively small amounts of the above-described polymerizable olefin hydrocarbons or may be made up entirely of such materials. It is preferred to have an olefin feed stock containing no less than 5 wt. percent of the polymerizable olefin hydrocarbon and in general can contain impurities such as the paraffins, isoparaffins, and generally the same impurities as may be tolerated by the Friedel Crafts catalyst known to the prior art. As an example, purified refinery feed streams can be employed in the process of this invention, such as those feed streams containing for example 30 to 90 parts by weight propylene, 30 to 50 parts by weight propane, 0 to 15 parts by weight isobutane and butane, with less than 4 parts by weight other olefin hydrocarbons such as ethylene and isobutylene. The catalyst system is an improved modification of a Friedel Crafts type catalyst. As stated above the initial component to the catalyst system may be any of the Friedel Crafts type metal halides exemplified by $AlCl_3$, $AlBr_3$, $GaCl_3$, $TiCl_3$, $ZnCl_2$ $FeCl_3$, $BF_3$, and the like, the preferred initial component being $AlCl_3$. The promoter that is combined with the metal halide is an aliphatic, carbon-bonded, halogen-containing hydrocarbon polymer particularly chlorine containing vinyl polymers such as polymerized vinyl chloride polymers and polymers formed by the polymerization of halogen containing vinyl monomer with other polymerizable materials such as vinyl acetate, vinyl propionate, methyl methacrylate, or diethylmaleate. The halogen-containing hydrocarbon polymers in addition include those derived from such vinyl compounds as vinyl chloroacetate, chlorobutadienes, vinylidene chloride and the like. By the use of the term halogen-containing hydrocarbon polymer is meant a polymer in which a predominant portion, that is more than 50% by weight of the polymer, is made from a halogen containing vinyl monomer such as vinyl chloride. It is preferred however that the halogen containing polymer have at least 80% by weight of the polymer derived from a chlorine containing polymerizable vinyl monomer, still more preferably at least 95% by weight derived from such monomer. In general the vinyl monomer contains from 2 to 8 carbon atoms and from 1 to 3 atoms of chlorine per molecule of monomer depending on the particular monomer that is utilized. It will be understood that for the purposes of this specification that the term polymer is used in the generic sense to include homopolymers, copolymers, terpolymers or other interpolymers which have molecular weights of at least about 10,000 preferably from about 50,000 to about 150,000 having from about 20 to about 75 wt. percent chlorine more preferably from about 40 to about 60 wt. percent chlorine. The halogen containing polymers in general are for the most part amorphous solids or crystalline solids and when utilized in the process of this invention generally have a particle size of from about 5 microns to about ½ inch. Preferably a Tyler mesh size of from about 50 to about 100 is utilized. As stated above the halogen containing polymers include halogen which is bonded to an aliphatic carbon atom. It has been found that these particular types of polymers are particularly advantageous in the modified metal halide halogen containing polymer catalyst system. The chlorine contents as set forth above refer to aliphatic carbon bonded halogen. In addition the particular polymers in general have densities of from about 1.20 to about 1.55 more preferably from about 1.30 to about 1.40. Illustrative are the copolymers of a vinyl halide, such as vinyl chloride, with other monomers such as vinyl esters of carboxylic acids, e.g. vinyl acetate, vinyl propionate, vinyl butyrate, vinyl benzoate; esters of unsaturated acids, e.g., alkyl acrylates such as methyl acrylate, ethyl acrylate, propyl acrylate, butyl acrylate, allyl acrylate, and the corresponding esters of methacrylic acid; vinyl aromatic compounds, e.g., styrene, ortho-chlorostyrene, para-chlorostyrene, 2,5 - di-chlorostyrene, 2,4 - dichlorostyrene, para-ethylstyrene, vinyl naphthalene, a-methyl styrene; dienes such as butadiene; unsaturated amides such as acrylic acid amide and acrylic acid anilide; unsaturated nitriles such as acrylonitrile; esters of a,b-unsaturated carboxylic acids, e.g., the methyl, ethyl, propyl, butyl, amyl, hexyl, heptyl, octyl, allyl, methallyl and phenyl esters of maleic, crotonic, itaconic and fumaric acids and the like. It should be recognized that the halogen containing polymers include halogens other than chlorine, e.g., bromine, fluorine and iodine, which are also contemplated within the scope of this invention.

The invention can be better appreciated by the following non-limiting examples:

EXAMPLE 1

To a one liter polymerization reactor equipped with stirrer, cooling means, gas inlet and exit means is charged 4.0 grams of anhydrous aluminum chloride, 2.0 grams of polyvinyl chloride having a molecular weight of 100,000, a density of 1.35, and a chlorine content of 56 wt. percent and 500 milliliters of n-hexane under a nitrogen atmosphere. The temperature is reduced to 0° C. and propylene (gaseous) is introduced at a rate of 108 milliliters per minute over a period of 3 hours. To the mixture is added 50 milliliters of a 1:1 (volume basis) solution of water and isopropyl alcohol. The product mixture is then washed with a saturated aqueous solution of sodium bicarbonate until neutral. The n-hexane polymer phase is then dried and the hexane evaporated under reduced pressure. A polypropylene polymer (30.9 grams) is obtained which has an average molecular weight of 1,023.

EXAMPLE 2

Utilizing the equipment as described in Example 1, gaseous propylene is introduced into the reactor utilizing the same conditions, concentration and catalyst system as in Example 1 except that 4 grams of the polyvinyl chloride is utilized. A polypropylene polymer is recovered (33.8 grams) which has an average molecular weight of 1,058.

EXAMPLE 3

Utilizing the same equipment as described in Example 1, gaseous propylene is polymerized under the same conditions as set forth in Example 1 except that 2.7 grams of aluminum bromide and 0.6 gram of polyvinyl chloride the properties of which are set forth in Example 1 is utilized as the catalyst system. After a period of 3 hours at a temperature of 0° C., a polypropylene polymer is recovered (32.6 grams) having an average molecular weight of 757.

The results set forth in Examples 1 through 3 demonstrate the outstanding performance of the process of this invention for preparing polymers of olefin hydrocarbons utilizing a Friedel Crafts metal halide and halogen containing hydrocarbon catalyst system. More particularly Examples 1 through 3 demonstrate that a polypropylene polymer having a molecular weight within the range of from about 700 to about 2500 is prepared in good yields utilizing such a catalyst system. These results are quite surprising in view of the fact that high molecular weight alkyl halides are not effective cocatalysts when utilized in combination with a Friedel Crafts metal halide catalyst for the polymerization of olefin hydrocarbons. Thus, the process of this invention is capable of using a high molecular weight cocatalyst which can be readily separated from the olefin polymer prepared utilizing such catalyst. Thus, the use of a solid halogen containing hydrocarbon polymer particularly polyvinyl chloride in combination with a metal halide produces a catalyst system which provides for continued preparation of an olefin polymer over extended periods of time thereby extending greatly the effectiveness of the catalyst system. In addition, the catalyst system, that is metal halide and polymer cocatalyst can be easily removed from the polymer product.

Obviously, many modifications and variations of the invention as hereinabove set forth, may be made without departing from the spirit and scope thereof, and therefore, only such limitations should be imposed as are indicated in the appended claims.

I claim:

1. A process for polymerizing olefin hydrocarbons which comprises contacting an olefin at about −10° C. to 10° C. under about 15 to about 1000 p.s.i.g. with a catalytic amount of a Friedel Crafts metal halide and a halogen-containing hydrocarbon polymer catalyst having a molecular weight from about 10,000 to 150,000 in which more than 50% by weight of the polymer is made from a halogen-containing vinyl monomer containing only from 2 to 8 carbon atoms and 1 to 3 halogen atoms per molecule and recovering a polymer of said olefin hydrocarbon having a molecular weight within the range of from about 700 to about 2500.

2. A process of claim 1 wherein the olefin hydrocarbon contains from 2 to 20 carbon atoms and the halogen-containing hydrocarbon polymer is a solid chlorine-containing hydrocarbon polymer having a density ranging from about 1.20 to about 1.55.

3. A process of claim 2 wherein the olefin hydrocarbon contains from 3 to about 6 aliphatic carbon atoms.

4. A process of claim 1 wherein the metal halide catalyst is selected from the group consisting of aluminum chloride, aluminum bromide and boron trifluoride.

5. A process of claim 3 wherein the metal halide catalyst is selected from the group consisting of aluminum chloride, aluminum tribromide and boron trifluoride.

6. A process of claim 2 wherein the chlorine containing hydrocarbon polymer comprises at least 50% by weight of the polymer derived from polymerized vinyl chloride.

7. A process of claim 3 wherein the chlorine containing hydrocarbon polymer comprises at least 50 wt. percent of the polymer derived from polymerized vinyl chloride.

8. A process of claim 5 wherein the chlorine containing hydrocarbon polymer comprises at least 50 wt. percent of the polymer derived from polymerized vinyl chloride.

9. A process of claim 5 wherein the chlorine containing hydrocarbon polymer is polyvinyl chloride having a particle size of from about 50 to about 100 mesh.

10. A process of claim 9 wherein the olefin hydrocarbon is selected from the group consisting of propylene, and isobutylene.

References Cited
UNITED STATES PATENTS

| | | | |
|---|---|---|---|
| 3,326,866 | 6/1967 | Haag | 260—683.15 X |
| 3,370,101 | 2/1968 | Hayes et al. | 260—683.15 X |
| 3,397,196 | 8/1968 | Shearer et al. | 260—683.15 X |

PAUL M. COUGHLAN, Jr., Primary Examiner

U.S. Cl. X.R.

252—433, 442